Aug. 22, 1961   D. E. SHAILOR   2,996,912
VIBRATION THRESHOLD ANALYZING
Filed May 31, 1957   2 Sheets-Sheet 1

TYPICAL OSCILLOGRAPH RECORD

D. E. SHAILOR
INVENTOR.

BY E. E. McRae
J. R. Faulkner
D. H. Oster

ATTORNEYS

Aug. 22, 1961 D. E. SHAILOR 2,996,912
VIBRATION THRESHOLD ANALYZING
Filed May 31, 1957 2 Sheets-Sheet 2

D. E. SHAILOR
INVENTOR.
BY E.C. McRae
J.C. Faulkner
D.H. Oster
ATTORNEYS

United States Patent Office 2,996,912
Patented Aug. 22, 1961

2,996,912
VIBRATION THRESHOLD ANALYZING
Douglas E. Shailor, Livonia, Mich., assignor to Ford Motor Company, Dearborn, Mich., a corporation of Delaware
Filed May 31, 1957, Ser. No. 662,631
1 Claim. (Cl. 73—71.4)

This invention pertains to vibration analysis and more particularly to an apparatus and method for counting and presenting vibration data from automotive road tests.

The method in general use prior to my invention for obtaining and collecting vibration data during automobile road tests was to transcribe onto a moving oscillograph tape the actual waveform of the output from one or more vibration pickups. At the conclusion of the test, the oscillograph strip was analyzed by a trained observer, and from it, a curve was plotted of amplitude of excursion versus number of occurrences per mile. This plotted curve provides the engineer with an indication of the vibration shake characteristics of the particular station on which the vibration pickup was located on the vehicle. Considerable time was consumed in transcribing the oscillograph record into such a shake curve, and it is this that I have eliminated with my invention by providing an indication of amplitude and number of occurrences on a series of impulse counters.

I provide a series of counters actuated by a vibration pickup through amplifying channels which are pre-set to ascending orders of sensitivity so that each counter is actuated by progressively greater output from the vibration pickup. The data on the counters may then be used to plot a curve of amplitude versus frequency.

This and other advantages and objects of my invention will become apparent from the following description of an embodiment.

Figure 1:
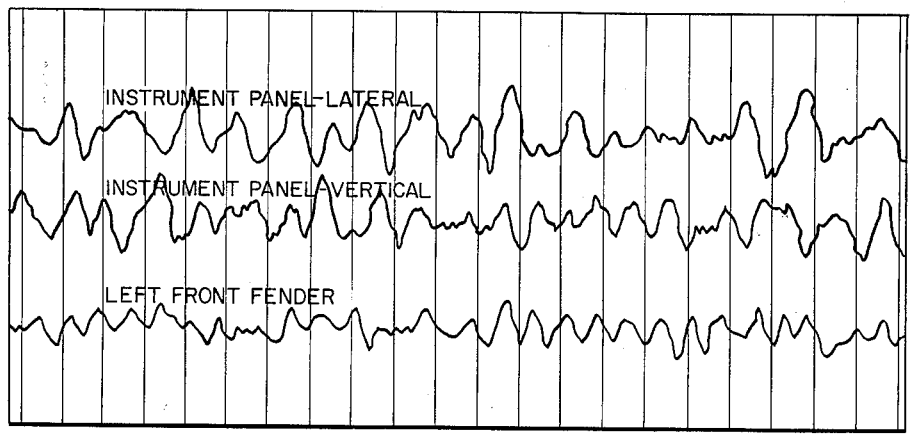
FIGURE 1 is a representative oscillograph record of the simultaneous output of three vibration pickups on a moving motor car.
Figure 2:
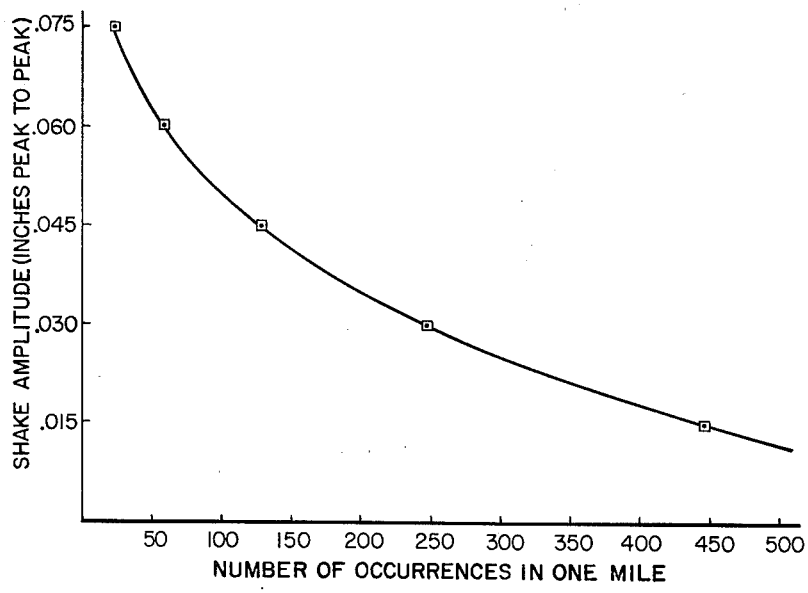
FIGURE 2 is a plot of a typical shake curve.

In FIGURE 1 is an oscillograph recording of the voltage outputs of three velocity pickups which may be variously positioned to sense shake or vibration on a moving car. As mentioned before, prior to my invention it was necessary to measure the amplitudes of the recorded peaks, and to count the number of such excursions for each amplitude in order to plot a curve such as shown in FIGURE 2.

The rate of pulse occurrences due to vibration or shake on a moving automobile usually falls within 10 to 16 cycles per second due to the natural rate of wheel bounce. Therefore, I provided a counter amplifier that has a substantially flat response from 7 to 17 c.p.s. which has been found sufficient. Also, I provide a voltage divider with fixed resistors to vary the input sensitivity of the counter in steps from .005″ peak-to-peak to .1″ peak-to-peak.

I prefer to employ 5 parallel counter channels having their inputs commonly connected, with each successive channel set to have 20% greater sensitivity than the least sensitive channel. These counter channels therefore provide data for five points on the curve as shown in FIGURE 2.

Figure 3:
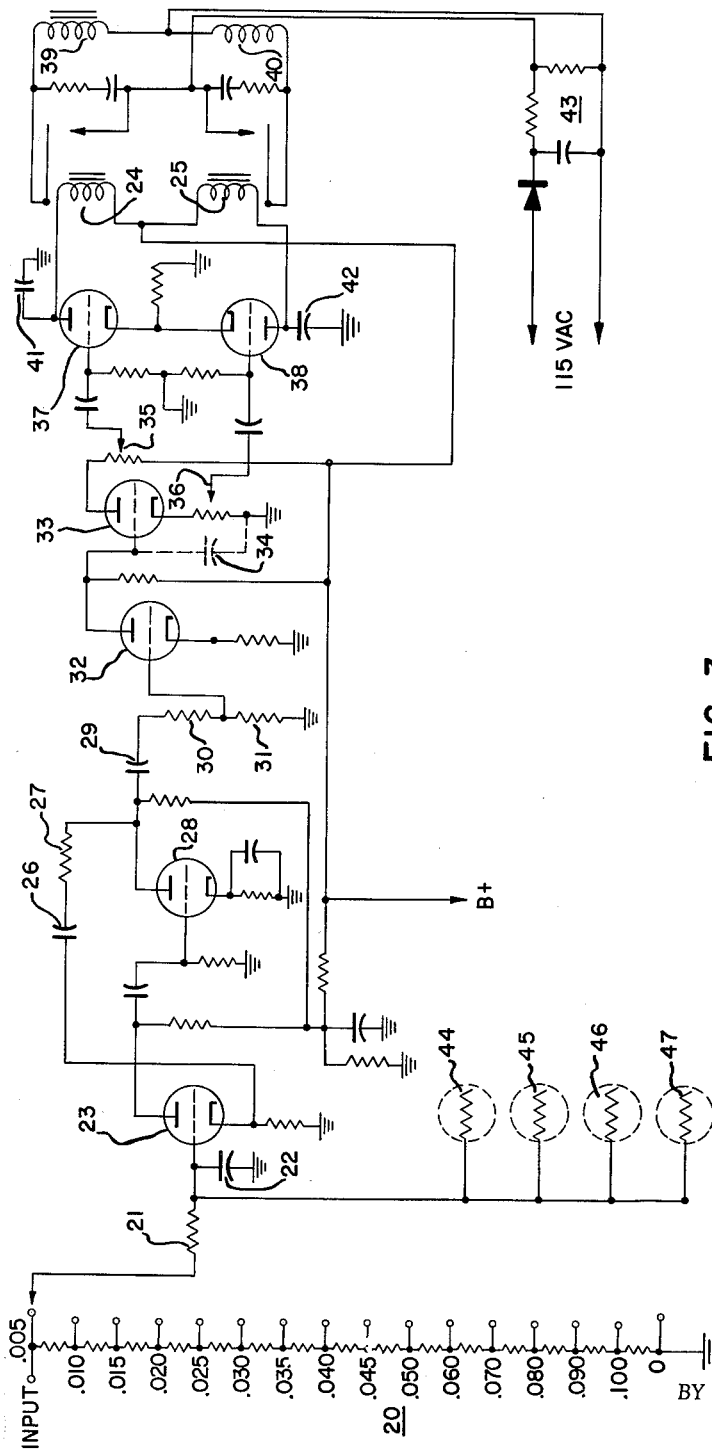
FIGURE 3 is an electrical schematic of a counter channel used by my invention.

The amplifier circuit shown in FIGURE 3 is designed to operate from a dynamic vibration pickup which provides a voltage output proportionate to velocity.

The vibration pickup may be of any commercial variety which preferably provides an output voltage proportionate to velocity of movement. It is necessary to integrate the output of the vibration pickup in order to obtain a voltage proportional to amplitude. For this purpose I provide an integrating network of resistor 21 and capacitor 22. To the junction of these elements I connect the input to similar amplifier channels 44, 45, 46, and 47. For the purpose of this explanation only one amplifier circuit is shown.

The output from the vibration pickup is applied to selector switch 20. This switch provides the selection of input sensitivities from .005″ with the switch in the position shown, up to .1″ peak-to-peak. In the position shown, channel 1 will record all excursions of .005″ amplitude or greater; channel 2 will record all excursions of .01″ amplitude or greater, etc., until channel 5 records all excursions of .025″ amplitudes and greater. This relationship holds true for any setting of switch 20.

The integrated input signal is applied to the grid of triode 23 and simultaneously to the parallel amplifier channels 44, 45, 46, and 47. The input signal is amplified and applied to tube 28. A portion of the output of tube 28 is applied to the cathode of tube 23 through capacitor 26 and resistor 27. This inverse feed back stabilizes the amplifier gain at low frequencies. The output of tube 28 is applied to tube 32 through coupling capacitor 29 and voltage divider 30 and 31. A potentiometer may be substituted for the voltage divider, the purpose of which is to select the overall gain desired. The output of tube 32 is directly coupled to phase inverter 33. A small capacitor 34 may be connected to the grid of phase inverter 33 and ground to attenuate high frequency response if desired.

The 180° difference signals are taken from potentiometer 35 in the plate circuit and potentiometer 36 in the cathode circuit of phase inverter 33 and are applied to output tube 37 and 38 respectively. Potentiometers 35 and 36 are adjustable for the calibration of the amplifier, and the balancing of outputs.

Output tubes 37 and 38 operate relays 24 and 25 respectively, and are operated in class "B" in order to be conductive only during the positive portion of the signal applied to their grids. Capacitors 41 and 42 remove hash and noise that may cause the relays to flutter.

Impulse counters 39 and 40 are operated by relays 24 and 25 respectively. These counters register the number of times that their respective relay is actuated. Suitable commercially available counters may be had which operate at the frequency required.

The counters are calibrated by potentiometers 35 and 36 to read total excursion peak-to-peak, one counter reading positive displacement and the other counter indicating negative displacement. The totals shown on the counters will correspond closely to each other and these totals are averaged prior to applying the information to a shake curve.

A suitable power supply for the counters is shown generally at 43.

I have found that two counters used as described provide an average count that corresponds with consistent accuracy to the actual count taken from an oscillograph tape. The use of such dual counters compensates for the error that would be recorded by a single counter when the impulse comes from a pickup on a motor car driven, for instance, over a broken road surface having a slow rise followed by a sudden fall.

As mentioned above, potentiometers 35 and 36 are adjusted for calibration of the amplifying channel. Any convenient method of calibration may be used. One such method consists of connecting a vibration pickup to a weighted steel bar anchored at one end and having the other end free. The bar length or mass should provide a frequency of decaying vibration within the frequency limits desired. An oscillograph tape may be made of the decaying waveform of the vibrating bar, and potentiometers 35 and 36 may be adjusted until (1) counters 39 and 40 provide identical readings and (2) until the reading corresponds to the total of peak-to-peak excursions as recorded on the oscillograph tape in excess of the amount corresponding to the setting of the selector switch 20. Corresponding potentiometers of channels 44, 45, 46, and 47 may then be adjusted for the sensitivity desired.

It will be understood that the invention is not to be limited to the exact construction shown and described, but that various changes and modifications may be made without departing from the spirit and scope of the invention, as defined in the appended claim.

What is claimed is:

A vibration data computer comprising a vibration pickup having an output voltage proportional to the velocity of movement of said pickup, a resistance-capacitance integrating network connected to receive said voltage output, said network providing an integrated signal having a peak-to-peak waveform proportional to the amplitude of movement of said pickup, an amplifier connected to receive said integrated signal including a phase inverter and providing an in-phase signal and an 180° out-of-phase signal proportional in amplitude to the integrated signal, a first impulse counter actuated by said in-phase signal and a second impulse counter actuated by said out-of-phase signal.

References Cited in the file of this patent

UNITED STATES PATENTS

| | | |
|---|---|---|
| 2,251,436 | Bentley et al. | Aug. 5, 1941 |
| 2,397,923 | Coss | Apr. 9, 1946 |
| 2,540,505 | Bliss | Feb. 6, 1951 |
| 2,735,292 | Apps | Feb. 21, 1956 |

OTHER REFERENCES

Periodical Instruments & Automation, August 1955, vol. 28, pp. 1334 and 1335.